(No Model.)
B. F. CHAPPELL.
CHUCK.
No. 374,732. Patented Dec. 13, 1887.
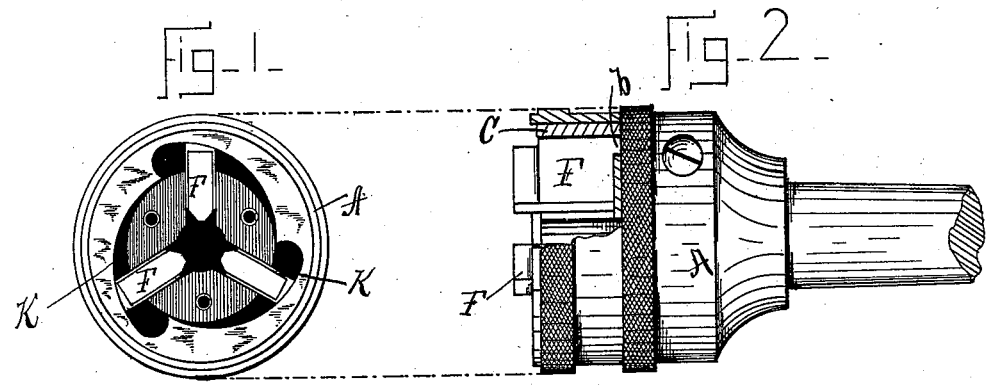
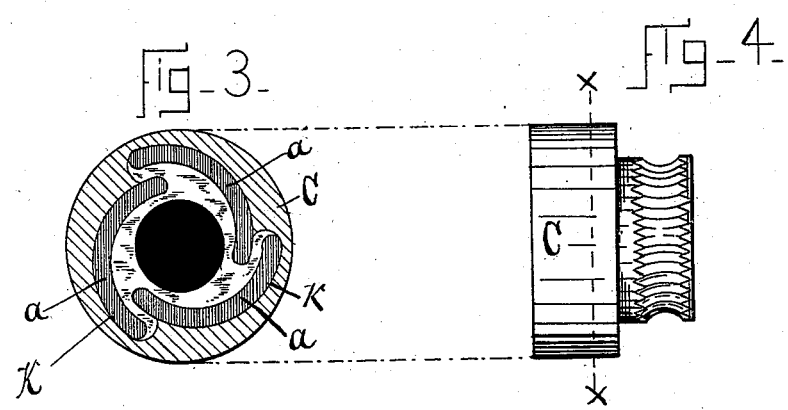
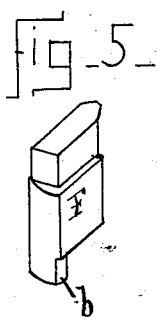
Witnesses
Tyler C. Howard
W. C. Farrington
Inventor
Benjamin F. Chappell
By his Attorney
Frank H. Allen

UNITED STATES PATENT OFFICE.

BENJAMIN F. CHAPPELL, OF SOUTH WINDHAM, CONNECTICUT.

CHUCK.

SPECIFICATION forming part of Letters Patent No. 374,732, dated December 13, 1887.

Application filed January 15, 1887. Serial No. 224,408. (No model.)

*To all whom it may concern:*

Be it known that I, BENJAMIN F. CHAPPELL, of South Windham, Windham county, Connecticut, have invented a certain new and useful Improvement in Chucks, which improvement is fully set forth and described in the following specification, reference being had to the accompanying sheet of drawings.

My invention relates to so-called "drill-chucks;" and it consists of a certain improvement on a chuck patented by me March 10, 1885, No. 313,472, whereby I am able to simplify the construction therein set forth, thus reducing the cost of construction. My new form of chuck also enables me to assemble the several parts with greater facility.

Figure 1 in the annexed drawings is an end view of a chuck of my new construction with end plate removed to expose the jaws and cams. Fig. 2 is a side view of said chuck having a portion of the outer case and of one cam cut away to expose the jaw. Fig. 3 is a cross-section of the cam-shell, taken on line $x\,x$ of Fig. 4, which Fig. 4 represents a side view of said cam-shell. Fig. 5 is a detached perspective view of one of the jaws.

My chuck may be briefly described as a rotatable shell, C, within an outer case, A, said rotatable shell being formed with a series of internal cams, K, each of which engages a jaw, F, adapted to travel radially toward or from the center of the chuck. For a detailed description of said chuck reference is made to the Patent No. 313,472, above referred to. In said former patent the jaws were spread or forced outward by springs, one for each jaw; but I find in practice that said springs, being compressed a great portion of the time, soon lose their elasticity and fail to work promptly and satisfactorily. I have also found it somewhat awkward to assemble the several parts when springs are used, and to overcome these defects I have provided a groove or slot in the cam-shell C at the base of each cam, (see $a$, Fig. 3,) and have added a projecting stud, $b$, on the rear outer edge of each jaw, which enters and travels in the cam-groove $a$. I have also dispensed with the pieces $i$ shown in my former patent, allowing the cams to act directly against the jaws.

When the cam-shell is rotated within the case, the jaws are forced inward by the wedge-shaped cams, and when the movement of the cams is reversed the grooves $a$ then act to draw the jaws outward, as will be understood by referring to the drawings.

I am thus able to dispense with six pieces, or nearly one-half of the whole number formerly used.

Having thus described my invention, I claim—

In combination, in a chuck, an inclosing-case, a rotatable shell located within said case, provided with a series of internal cams, K, and parallel grooves $a$, and a corresponding series of radially-movable jaws capable of engagement with said cams and provided with studs $b$, which engage said cam-grooves, all being as herein described, and for the objects set forth.

BENJAMIN F. CHAPPELL.

Witnesses:
LOUIS PUTOZ,
CHAS. BROADHURST.